No. 865,438. PATENTED SEPT. 10, 1907.
M. N. SHELL.
CAR MOVER.
APPLICATION FILED MAY 22, 1907.
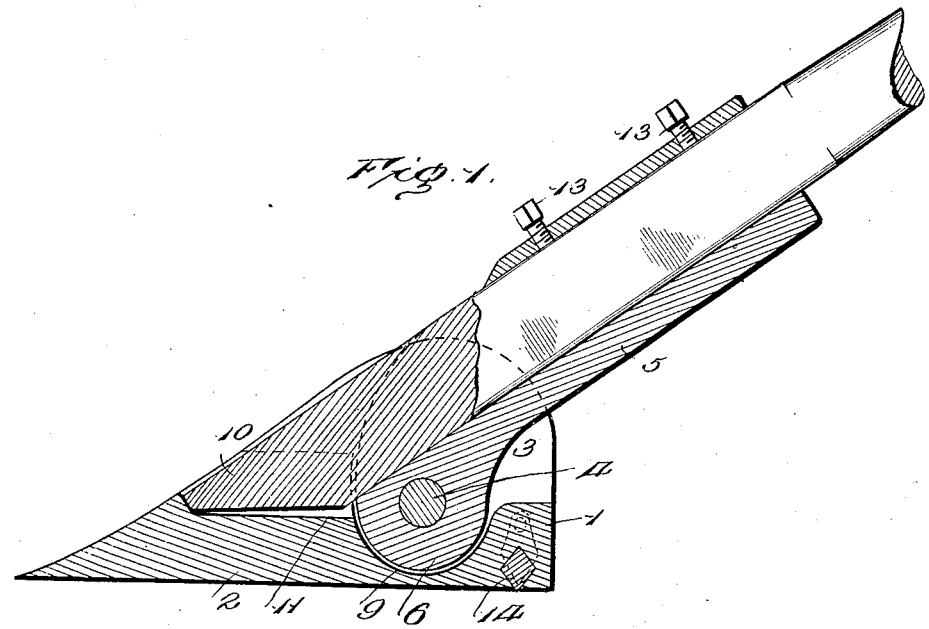
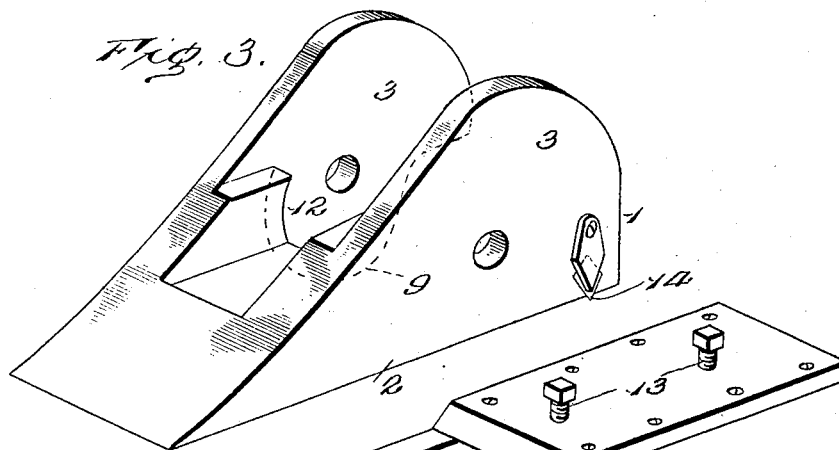
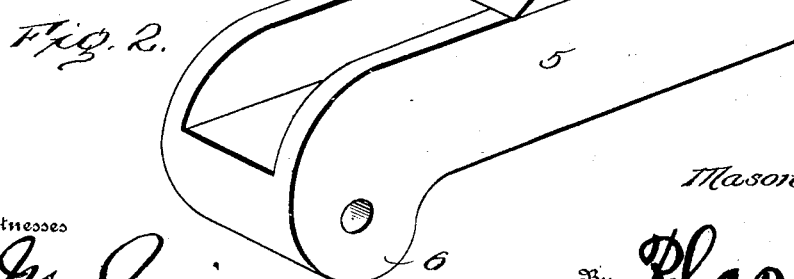
Witnesses
Inventor
Mason N. Shell
By R. H. A. R. Lacey,
Attorneys
THE NORRIS PETERS CO., WASHINGTON, D. C.

UNITED STATES PATENT OFFICE.

MASON N. SHELL, OF ECKMAN, WEST VIRGINIA.

CAR-MOVER.

No. 865,438.  Specification of Letters Patent.  Patented Sept. 10, 1907.

Application filed May 22, 1907. Serial No. 375,079.

*To all whom it may concern:*

Be it known that I, MASON N. SHELL, a citizen of the United States, residing at Eckman, in the county of McDowell and State of West Virginia, have invented certain new and useful Improvements in Car-Movers, of which the following is a specification.

The present invention has relation to certain new and useful improvements in car movers for pinch arms of that type embodying a foot or shoe constituting a fulcrum member and designed to be placed against the periphery of the car wheel, and an operating lever mounted upon the said fulcrum member and designed to engage the car wheel and impart a forward impulse to the car.

The primary object of the invention is to design a simple and inexpensive car mover of this type in which an ordinary crow bar or analogous implement may be utilized as the operating lever.

For a full description of the invention and the merits thereof and also to acquire a knowledge of the details of construction and the means for effecting the result, reference is to be had to the following description and accompanying drawings, in which:

Figure 1 is a longitudinal sectional view through a car mover embodying the invention. Fig. 2 is a detail view of the sleeve. Fig. 3 is a similar view of the fulcrum member.

Corresponding and like parts are referred to in the following description and indicated in all the views of the drawings by the same reference characters.

Specifically describing the present embodiment of the invention the numeral 1 designates the foot or fulcrum member upon which the operating lever is mounted. This foot 1 comprises the base 2 and the approximately parallel and upwardly extending sides 3, the edges of the said sides being curved upwardly from the forward end or toe of the foot to correspond to the periphery of the car wheel in connection with which the implement is designed to be employed. These sides 3 are connected by a pin 4 upon which a sleeve 5 is pivotally mounted. It will be observed that the sides and bottom of the sleeve 5 are extended forwardly and that the said bottom is provided upon its lower face with an enlargement 6 received within a corresponding depression 9 in the base 2 and formed with an opening for the pin 4. An ordinary crow bar or similar implement is designed to be utilized as an operating lever and the same is drawn through the sleeve 5, the beveled end of the crow bar 10 fitting within a corresponding recess 11 in the base 2 and lying approximately flush with the edges of the sides 3 when the implement is placed in position against the periphery of a car wheel. Attention may also be directed that the sides 3 of the fulcrum member are cut away as indicated at 12 to receive the sides of the sleeve 5 so that the interior side walls of the sleeve and the recess 11 are approximately in alinement with each other. A pair of set screws 13 are utilized for locking the crow bar rigidly in position within the sleeve in order to prevent longitudinal movement of the same during the operation of the device. In order to prevent any slipping of the fulcrum member upon the rail the rear end or heel portion of the same is provided with an angular under-cut transversely disposed groove receiving an angular bar 14 one of the edges of which projects outwardly beyond the lower face of the fulcrum member so as to bite into the rail and thereby produce a positive engagement with the same.

In the operation of the device the operating lever or crow bar 10 is elevated so that the beveled end thereof is received within the recess 11 and the fulcrum member 1 then placed in position against the periphery of the car wheel in the usual manner. Upon forcing the swinging end of the operating lever downwardly the beveled end thereof will be moved upwardly into engagement with the car wheel and will impart a forward impulse to the car. Attention may also be directed to the fact that by moving the lever 10 within the sleeve 5 the leverage of the implement can be adjusted to correspond to the size of the wheel or the weight of the car being moved.

Having thus described the invention, what is claimed as new is:

1. In a car mover, the combination of a fulcrum member, a sleeve pivotally mounted upon the fulcrum member, and an operating lever adjustably received within the sleeve.

2. In a car mover, the combination of a fulcrum member comprising a base and sides, a pivot pin connecting the sides, a sleeve provided with an enlargement receiving the pivot pin, and an operating lever mounted within the sleeve.

3. In a car mover, the combination of a fulcrum member comprising a base and sides, the base being formed with a depression, a pin connecting the sides, a sleeve provided with an enlargement received within the depression and pivotally mounted upon the pin, and an operating lever mounted within the sleeve.

4. In a car mover, the combination of a fulcrum member comprising a base having a recess formed in the forward portion thereof and a depression in the rear portion thereof, a pin connecting the sides, a sleeve provided with an enlargement received within the depression and pivotally mounted upon the pin, and an operating lever mounted within the sleeve and having the inner end thereof normally received within the before mentioned recess.

5. In a car mover, the combination of a fulcrum member having a depression formed therein, a sleeve pivotally mounted upon the fulcrum member and provided with an enlargement received within the depression, and an operating lever adjustably mounted within the sleeve.

In testimony whereof I affix my signature in presence of two witnesses.

MASON N. SHELL. [L. S.]

Witnesses:
 ISIDOR KLEIMAN,
 E. O. BERNARD.